United States Patent [19]
Johnson, Jr.

[11] Patent Number: 5,845,346
[45] Date of Patent: Dec. 8, 1998

[54] WATER RECYCLING SYSTEM

[76] Inventor: Carl W. R. Johnson, Jr., 99 Arcadia St., Revere, Mass. 02151

[21] Appl. No.: 41,252

[22] Filed: Mar. 12, 1998

[51] Int. Cl.[6] ....................................................... A41K 4/00
[52] U.S. Cl. ..................................................................... 4/665
[58] Field of Search ................................................... 4/665

[56] References Cited

U.S. PATENT DOCUMENTS

| | | | |
|---|---|---|---|
| 3,112,497 | 12/1963 | Call | 4/665 X |
| 4,162,218 | 7/1979 | McCormick | 4/665 X |
| 4,197,597 | 4/1980 | Toms | 4/665 X |
| 5,106,493 | 4/1992 | McIntosh | 4/665 X |

*Primary Examiner*—Charles E. Phillip

[57] ABSTRACT

An apparatus for utilizing gray water for flushing a toilet is provided including a holding tank with a top face, a bottom face, and a periphery formed therebetween thus defining an interior space. The holding tank has an inlet pipe connected to a source of gray water for receiving gray water therefrom. An outlet pipe is connected between the holding tank adjacent to the bottom face thereof and a toilet. A tee is situated on the outlet pipe between the holding tank and the toilet. The tee has an opening coupled to a water supply adapted to supply water of a first pressure. The tee further has a valve having a first orientation for allowing the flow of water only from the water supply to the toilet and a second orientation for allowing the flow of water only from the holding tank to the toilet. A pump is coupled to the outlet pipe between the holding tank and the compression tee. The pump is adapted to create a second pressure within the outlet pipe which is greater than the first pressure only during the presence of water within the holding tank.

7 Claims, 2 Drawing Sheets

WATER RECYCLING SYSTEM

BACKGROUND OF THE INVENTION

1. Field of the Invention

The present invention relates to recycling methods and more particularly pertains to a new water recycling system for providing a back-up water source for a gray water supply which, in turn, is used to supply a toilet with water.

2. Description of the Prior Art

The use of recycling methods is known in the prior art. More specifically, recycling methods heretofore devised and utilized are known to consist basically of familiar, expected and obvious structural configurations, notwithstanding the myriad of designs encompassed by the crowded prior art which have been developed for the fulfillment of countless objectives and requirements.

Known prior art recycling methods include U.S. Pat. No. 5,406,657; U.S. Pat. No. 5,243,719; U.S. Pat. No. 4,162,218; U.S. Pat. No. 5,403,498; and U.S. Pat. Des. 338,891.

In these respects, the water recycling system according to the present invention substantially departs from the conventional concepts and designs of the prior art, and in so doing provides an apparatus primarily developed for the purpose of providing a backup water source for a gray water supply which, in turn, is used to supply a toilet with water.

SUMMARY OF THE INVENTION

In view of the foregoing disadvantages inherent in the known types of recycling methods now present in the prior art, the present invention provides a new water recycling system construction wherein the same can be utilized for providing a back-up water source for a gray water supply which, in turn, is used to supply a toilet with water.

The general purpose of the present invention, which will be described subsequently in greater detail, is to provide a new water recycling system apparatus and method which has many of the advantages of the recycling methods mentioned heretofore and many novel features that result in a new water recycling system which is not anticipated, rendered obvious, suggested, or even implied by any of the prior art recycling methods, either alone or in any combination thereof.

To attain this, the present invention generally comprises a holding tank situated within a basement of a house with a top face, a bottom face, and a periphery formed therebetween thus defining an interior space. The holding tank has an inlet pipe connected to the top face thereof. Such inlet pipe is further connected to a sink, a washer, a shower, and a bath tub of the house for receiving gray water therefrom. For allowing the discharge of water when the holding tank is full, an overflow pipe is connected to the holding tank adjacent the top face thereof and further connected to a sewer system. Mounted to the top face of the holding tank is an air purge valve. During use, the purge valve is adapted to allow the release of air pressure therefrom upon the same exceeding a predetermined amount. As shown in FIG. 1, an outlet pipe is connected between the holding tank adjacent to the bottom face thereof and the toilet. With reference now to FIG. 2, a compression tee is situated on the outlet pipe between the holding tank and the toilet. The compression tee has an opening coupled to a water supply which serves to supply water of a first pressure. A circular valve plate is pivotally coupled within the outlet pipe adjacent to the opening. A top gasket is mounted to a top face of the valve plate and a bottom gasket mounted to a bottom face of the valve plate. By this structure, the valve plate has a first orientation with the top face of the plate abutting the interior of the outlet pipe for allowing the flow of water only from the water supply to the toilet. In a second orientation, the bottom face of the plate covers the opening thereby allowing the flow of water only from the holding tank to the toilet. Finally, a pump is coupled to the outlet pipe between the holding tank and the compression tee. During use, the pump is adapted to create a second pressure within the outlet pipe which is greater than the first pressure only during the presence of water within the holding tank.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new water recycling system apparatus and method which has many of the advantages of the recycling methods mentioned heretofore and many novel features that result in a new water recycling system which is not anticipated, rendered obvious, suggested, or even implied by any of the prior art recycling methods, either alone or in any combination thereof.

It is another object of the present invention to provide a new water recycling system which may be easily and efficiently manufactured and marketed.

It is a further object of the present invention to provide a new water recycling system which is of a durable and reliable construction.

An even further object of the present invention is to provide a new water recycling system which is susceptible of a low cost of manufacture with regard to both materials and labor, and which accordingly is then susceptible of low prices of sale to the consuming public, thereby making such water recycling system economically available to the buying public.

Still yet another object of the present invention is to provide a new water recycling system which provides in the apparatuses and methods of the prior art some of the advantages thereof, while simultaneously overcoming some of the disadvantages normally associated therewith.

Still another object of the present invention is to provide a new water recycling system for providing a back-up water source for a gray water supply which, in turn, is used to supply a toilet with water.

Even still another object of the present invention is to provide a new water recycling system that includes a holding tank with a top face, a bottom face, and a periphery formed therebetween thus defining an interior space. The holding tank has an inlet pipe connected to a source of gray water for receiving gray water therefrom. An outlet pipe is connected between the holding tank adjacent to the bottom face thereof and a toilet. A tee is situated on the outlet pipe between the holding tank and the toilet. The tee has an opening coupled to a water supply adapted to supply water of a first pressure. The tee further has a valve having a first orientation for allowing the flow of water only from the water supply to the toilet and a second orientation for allowing the flow of water only from the holding tank to the toilet. A pump is coupled to the outlet pipe between the holding tank and the compression tee. The pump is adapted to create a second pressure within the outlet pipe which is greater than the first pressure only during the presence of water within the holding tank.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
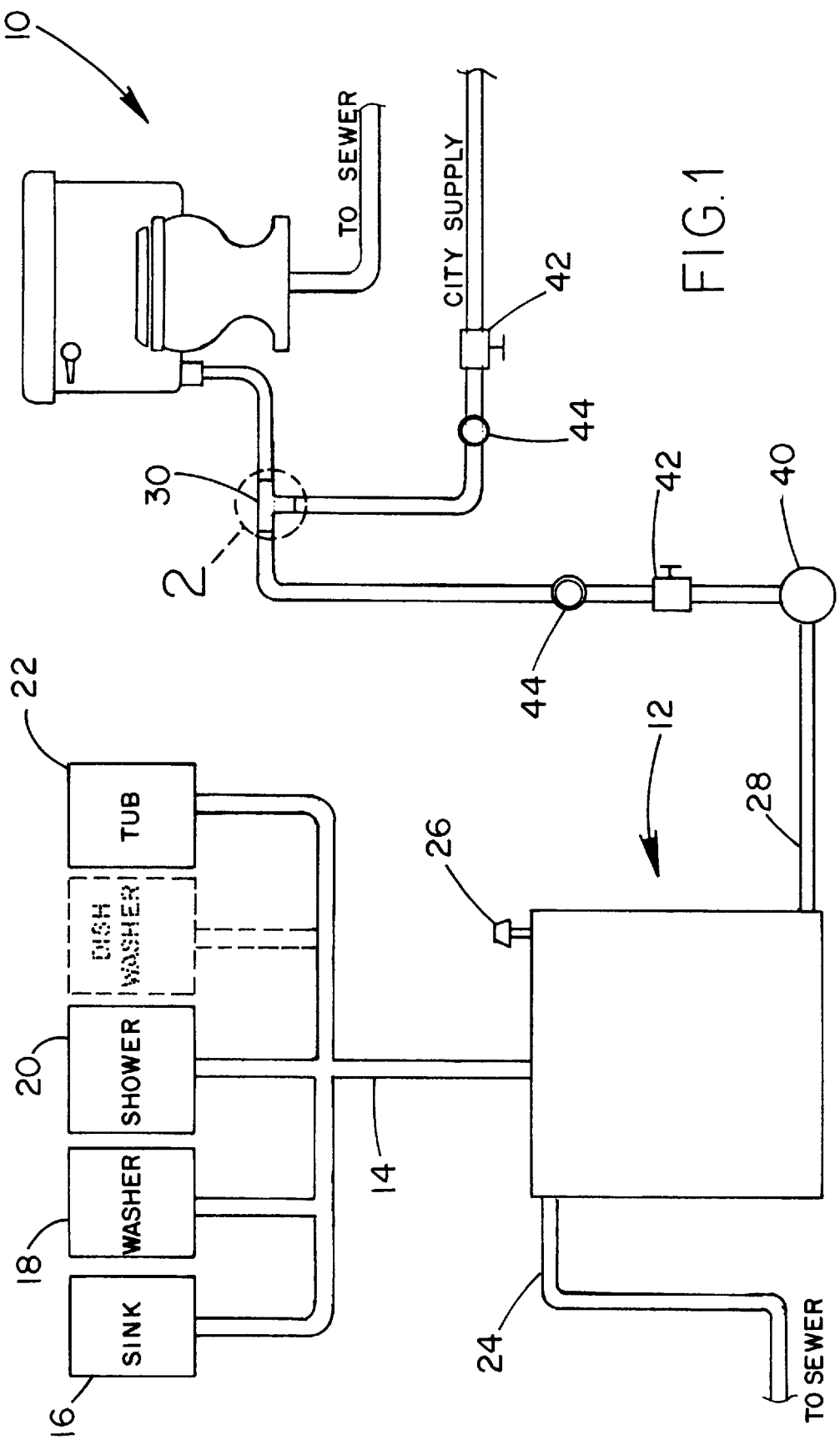
FIG. 1 is a schematic view of a new water recycling system according to the present invention.
Figure 2:
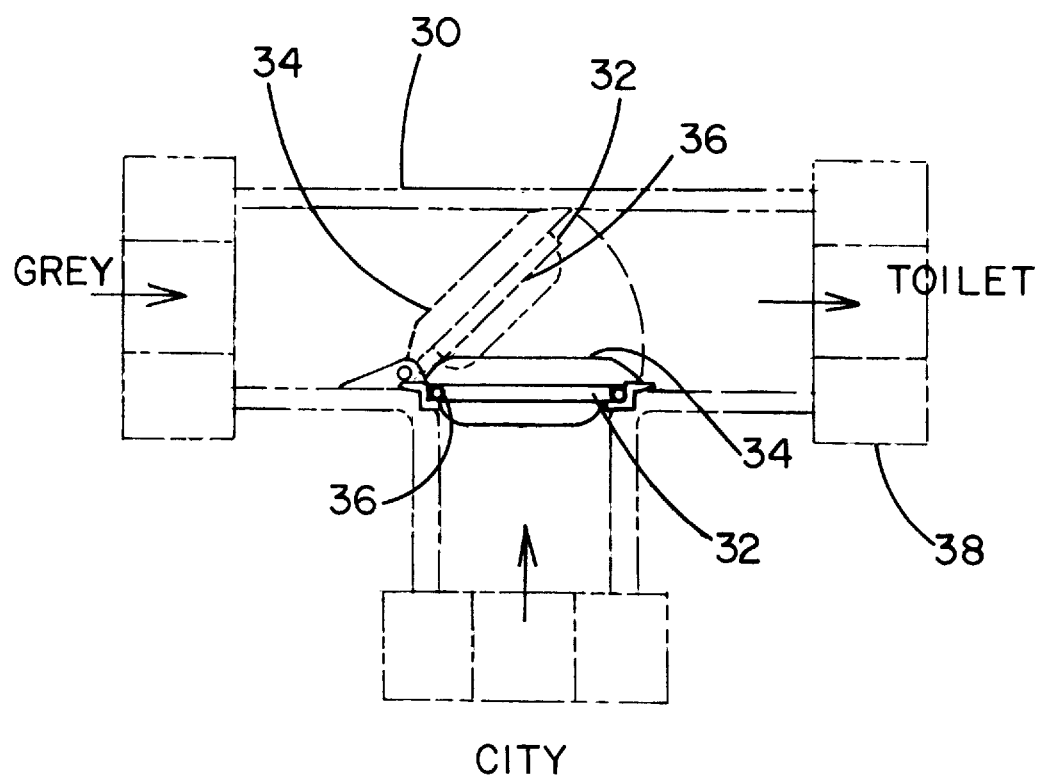
FIG. 2 is a cross-sectional view of the tee of the present invention.

With reference now to the drawings, and in particular to FIGS. 1 through 2 thereof, a new water recycling system embodying the principles and concepts of the present invention and generally designated by the reference numeral 10 will be described.

The present invention, as designated as numeral 10, includes a holding tank 12 situated within a basement of a house with a top face, a bottom face, and a periphery formed therebetween thus defining an interior space. The holding tank has a vertical inlet pipe 14 connected to the top face thereof. Such inlet pipe is further connected to a sink 16, a washer 18, a shower 20, and a bath tub 22 of the house for receiving gray water therefrom.

For allowing the discharge of water when the holding tank is full, an overflow pipe 24 is connected to the holding tank adjacent the top face thereof and further connected to a sewer system. As an option, the overflow pipe may be fed to a garden or the like. In either embodiment, the overflow pipe ideally has a U-shaped portion to prevent the back flow of sewer gas.

Mounted to the top face of the holding tank is an air purge valve 26. During use, the purge valve is adapted to allow the release of air pressure therefrom upon the same exceeding a predetermined amount. This is to protect against pressure within the tank from building to dangerous levels.

As shown in FIG. 1, an outlet pipe 28 is connected between the holding tank adjacent to the bottom face thereof and the toilet.

With reference now to FIG. 2, a compression tee 30 is situated on the outlet pipe between the holding tank and the toilet. The compression tee has an opening coupled to a water supply 31 which serves to supply water of a first pressure. Such water supply preferably takes the form of city water supply. A circular valve plate 32 is hingably coupled within the outlet pipe adjacent to the opening. A top annular gasket 34 is mounted to a top face of the valve plate and a bottom annular gasket 36 mounted to a bottom face of the valve plate. In the alternative, a sweat tee may be employed in lieu of the compression tee. In either embodiment, the tee may be releasably coupled to the outlet pipe and water supply by way of screw sleeves 38, as shown in FIG. 2.

By this structure, the valve plate has a first angled orientation with the top face of the plate abutting the interior of the outlet pipe for allowing the flow of water only from the water supply to the toilet. In a second horizontal orientation, the bottom face of the plate covers the opening thereby allowing the flow of water only from the holding tank to the toilet. Note FIG. 2

Finally, a pump 40 is coupled to the outlet pipe between the holding tank and the compression tee. It should be noted that the pump may be situated within or external of the holding tank. During use, the pump is adapted to create a second pressure within the outlet pipe which is greater that the first pressure only during the presence of water within the holding tank. Such pressure is preferably about 5 pounds per square inch. The foregoing function may be accomplished by way of a moisture sensor and pressure cut off switch or the like. As such, the water from the holding tank will be used, if present, and the water supply is used as a back-up means.

As an option, a manual cut-off valve 42 and a pressure gauge 44 are mounted on both the outlet pipe and a pipe connected to the water supply. It should be noted that the pressure gauges are each situated down stream from the associated manual cut-off valve. As such, the pressure within the respective pipes may be monitored and controlled.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An apparatus for utilizing gray water for flushing a toilet comprising:

a holding tank having an interior space, the holding tank having an inlet pipe connected to a source of gray water for receiving gray water therefrom;

an outlet pipe connected between the holding tank and a toilet;

a valve means;

said outlet pipe having an opening coupled to a fresh water supply adapted to supply fresh water of a first pressure to said valve means, whereby the valve means has a first orientation for allowing the flow of water only from the fresh water supply to the toilet and a second orientation for allowing the flow of water only from the holding tank to the toilet; and a pump coupled to the outlet pipe between the holding tank and the valve means, the pump adapted to create a second pressure within the outlet pipe which is greater than the first pressure only during the presence of water within the holding tank, thus causing said means to prevent flow of water from fresh water supply.

2. An apparatus for utilizing gray water as set forth in claim 1 wherein the source of gray water is a sink, a washer, a shower, and a bath tub.

3. An apparatus for utilizing gray water as set forth in claim 1 wherein an overflow pipe is connected to the holding tank adjacent a top face thereof and further connected to a sewer system for allowing the discharge of water when the holding tank is full.

4. An apparatus for utilizing gray water as set forth in claim 1 wherein an air purge valve is mounted to a top face of the holding tank and adapted to allow the release of air pressure therefrom upon the same exceeding a predetermined amount.

5. An apparatus for utilizing gray water as set forth in claim 1 wherein the valve means includes a circular valve plate pivotally coupled within the outlet pipe adjacent to the opening whereby the valve plate abuts an interior of the outlet pipe in the first orientation for allowing the flow of water only from the water supply to the toilet and covers the opening in the second orientation thereby allowing the flow of water only from the holding tank to the toilet.

6. An apparatus for utilizing gray water as set forth in claim 5 wherein a top gasket is mounted to the top face of the valve plate and a bottom gasket mounted to the bottom face of the valve plate.

7. An apparatus for utilizing gray water for flushing a toilet comprising, in combination:

a toilet;

a holding tank situated within a basement of a house with a top face, a bottom face, and a periphery formed therebetween thus defining an interior space, the holding tank having an inlet pipe connected to the top face thereof and further connected to a sink, a washer, a shower, and a bath tub of the house for receiving gray water therefrom;

an overflow pipe connected to the holding tank adjacent the top face thereof and further connected to a sewer system for allowing the discharge of water when the holding tank is full;

an air purge valve mounted to the top face of the holding tank and adapted to allow the release of air pressure therefrom upon the same exceeding a predetermined amount;

an outlet pipe connected between the holding tank adjacent to the bottom face thereof and the toilet;

a compression tee situated on the outlet pipe between the holding tank and the toilet, the compression tee having an opening coupled to a water supply adapted to supply water of a first pressure, a circular valve plate pivotally coupled within the outlet pipe adjacent to the opening, a top gasket mounted to a top face of the valve plate and a bottom gasket mounted to a bottom face of the valve plate, whereby the valve plate has a first orientation with the top face of the plate abutting the interior of the outlet pipe for allowing the flow of water only from the water supply to the toilet and a second orientation with the bottom face of the plate covering the opening thereby allowing the flow of water only from the holding tank to the toilet; and a pump coupled to the outlet pipe between the holding tank and the compression tee, the pump adapted to create a second pressure within the outlet pipe which is greater than the first pressure only during the presence of water within the holding tank.

\* \* \* \* \*